(12) United States Patent
Manolakos et al.

(10) Patent No.: US 11,483,044 B2
(45) Date of Patent: Oct. 25, 2022

(54) CHANNEL STATE INFORMATION REPORTING PRIORITIZATION

(71) Applicant: QUALCOMM Incorporated, San Diego, CA (US)

(72) Inventors: Alexandros Manolakos, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 16/947,877

(22) Filed: Aug. 21, 2020

(65) Prior Publication Data

US 2021/0091835 A1 Mar. 25, 2021

(30) Foreign Application Priority Data

Sep. 20, 2019 (GR) .............................. 20190100407

(51) Int. Cl.
*H04B 7/06* (2006.01)
*H04L 5/00* (2006.01)
(Continued)

(52) U.S. Cl.
CPC ......... *H04B 7/0626* (2013.01); *H04L 5/0044* (2013.01); *H04L 5/0051* (2013.01); *H04W 72/0446* (2013.01); *H04W 72/10* (2013.01)

(58) Field of Classification Search
CPC ... H04B 7/0626; H04L 5/0044; H04L 5/0051; H04L 1/0028; H04L 1/0027;
(Continued)

(56) References Cited

U.S. PATENT DOCUMENTS

2013/0242902 A1* 9/2013 Liu ...................... H04W 24/10
370/329
2014/0010126 A1* 1/2014 Sayana ................. H04L 5/0035
370/336
(Continued)

FOREIGN PATENT DOCUMENTS

EP 3471311 A1 4/2019
EP 3780410 A1 * 2/2021
WO 2019069296 A1 4/2019

OTHER PUBLICATIONS

International Search Report and Written Opinion—PCT/US2020/070449—ISA/EPO—dated Nov. 30, 2020.

*Primary Examiner* — Thai Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive a request to transmit a channel state information (CSI) report relating to a channel quality of a target time interval. The UE may receive a plurality of CSI reference signals associated with the CSI report. The UE may determine respective CSI parts for one or more sub-time intervals of the target time interval based at least in part on the plurality of CSI reference signals. The UE may prioritize one or more of the CSI parts based at least in part on respective time indices associated with the one or more sub-time intervals. The UE may transmit a subset of the CSI parts based at least in part on prioritizing the CSI parts. Numerous other aspects are provided.

27 Claims, 10 Drawing Sheets

(51) Int. Cl.
*H04W 72/10* (2009.01)
*H04W 72/04* (2009.01)

(58) Field of Classification Search
CPC ... H04L 5/0094; H04L 1/0026; H04L 5/0055; H04W 72/0446; H04W 72/10; H04W 72/0406; H04W 72/1226
See application file for complete search history.

(56) References Cited

U.S. PATENT DOCUMENTS

2017/0331670 A1* 11/2017 Parkvall .............. H04B 7/0617
2018/0324797 A1   11/2018 Hosseini et al.
2019/0149285 A1    5/2019 Tsai et al.

* cited by examiner

US 11,483,044 B2

CHANNEL STATE INFORMATION REPORTING PRIORITIZATION

CROSS-REFERENCE TO RELATED APPLICATION

This Patent Application claims priority to Greece Patent Application No. 20190100407, filed on Sep. 20, 2019, entitled "CHANNEL STATE INFORMATION REPORTING PRIORITIZATION," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for channel state information (CSI) reporting prioritization.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some wireless communication systems, a UE may report channel state information (CSI) to a base station. In some cases, a precoding matrix indicator payload size of a CSI report may vary in accordance with a rank indicator (RI) selection of the UE. However, the base station may allocate a resource in which the UE is to transmit a CSI report without knowledge of the RI selection of the UE. Accordingly, a payload size of a CSI report may be too large to be carried in the resource allocated to the UE for CSI reporting.

SUMMARY

In some aspects, a method of wireless communication performed by a user equipment (UE) may include receiving a request to transmit, in an occasion of a resource of a physical channel, a channel state information (CSI) report relating to a channel quality of a target time interval that is after a time interval in which a plurality of CSI reference signals associated with the CSI report are to be received. The method may include receiving, prior to the target time interval, the plurality of CSI reference signals associated with the CSI report. The method may include determining respective CSI parts for one or more sub-time intervals of the target time interval based at least in part on the plurality of CSI reference signals. The method may include prioritizing one or more of the CSI parts based at least in part on respective time indices associated with the one or more sub-time intervals. The method may include transmitting, in the occasion of the resource, a subset of the CSI parts based at least in part on prioritizing the CSI parts.

In some aspects, a UE for wireless communication includes a memory and one or more processors operatively coupled to the memory. The memory and the one or more processors may be configured to receive a request to transmit, in an occasion of a resource of a physical channel, a CSI report relating to a channel quality of a target time interval that is after a time interval in which a plurality of CSI reference signals associated with the CSI report are to be received. The memory and the one or more processors may be configured to receive, prior to the target time interval, the plurality of CSI reference signals associated with the CSI report. The memory and the one or more processors may be configured to determine respective CSI parts for one or more sub-time intervals of the target time interval based at least in part on the plurality of CSI reference signals. The memory and the one or more processors may be configured to prioritize one or more of the CSI parts based at least in part on respective time indices associated with the one or more sub-time intervals. The memory and the one or more processors may be configured to transmit, in the occasion of the resource, a subset of the CSI parts based at least in part on prioritizing the CSI parts.

In some aspects, a non-transitory computer-readable medium storing a set of instructions for wireless communication includes one or more instructions. The one or more instructions, when executed by one or more processors of a UE, may cause the UE to receive a request to transmit, in an occasion of a resource of a physical channel, a CSI report relating to a channel quality of a target time interval that is after a time interval in which a plurality of CSI reference signals associated with the CSI report are to be received. The one or more instructions, when executed by one or more processors of a UE, may cause the UE to receive, prior to the target time interval, the plurality of CSI reference signals associated with the CSI report. The one or more instructions, when executed by one or more processors of a UE, may cause the UE to determine respective CSI parts for one or more sub-time intervals of the target time interval based at least in part on the plurality of CSI reference signals. The one or more instructions, when executed by one or more processors of a UE, may cause the UE to prioritize one or more of the CSI parts based at least in part on respective time indices associated with the one or more sub-time intervals. The one or more instructions, when executed by one or more processors of a UE, may cause the UE to transmit, in the occasion of the resource, a subset of the CSI parts based at least in part on prioritizing the CSI parts.

In some aspects, an apparatus for wireless communication includes means for receiving a request to transmit, in an occasion of a resource of a physical channel, a CSI report relating to a channel quality of a target time interval that is after a time interval in which a plurality of CSI reference signals associated with the CSI report are to be received. The apparatus may include means for receiving, prior to the target time interval, the plurality of CSI reference signals associated with the CSI report. The apparatus may include means for determining respective CSI parts for one or more sub-time intervals of the target time interval based at least in part on the plurality of CSI reference signals. The apparatus may include means for prioritizing one or more of the CSI parts based at least in part on respective time indices associated with the one or more sub-time intervals. The apparatus may include means for transmitting, in the occasion of the resource, a subset of the CSI parts based at least in part on prioritizing the CSI parts.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
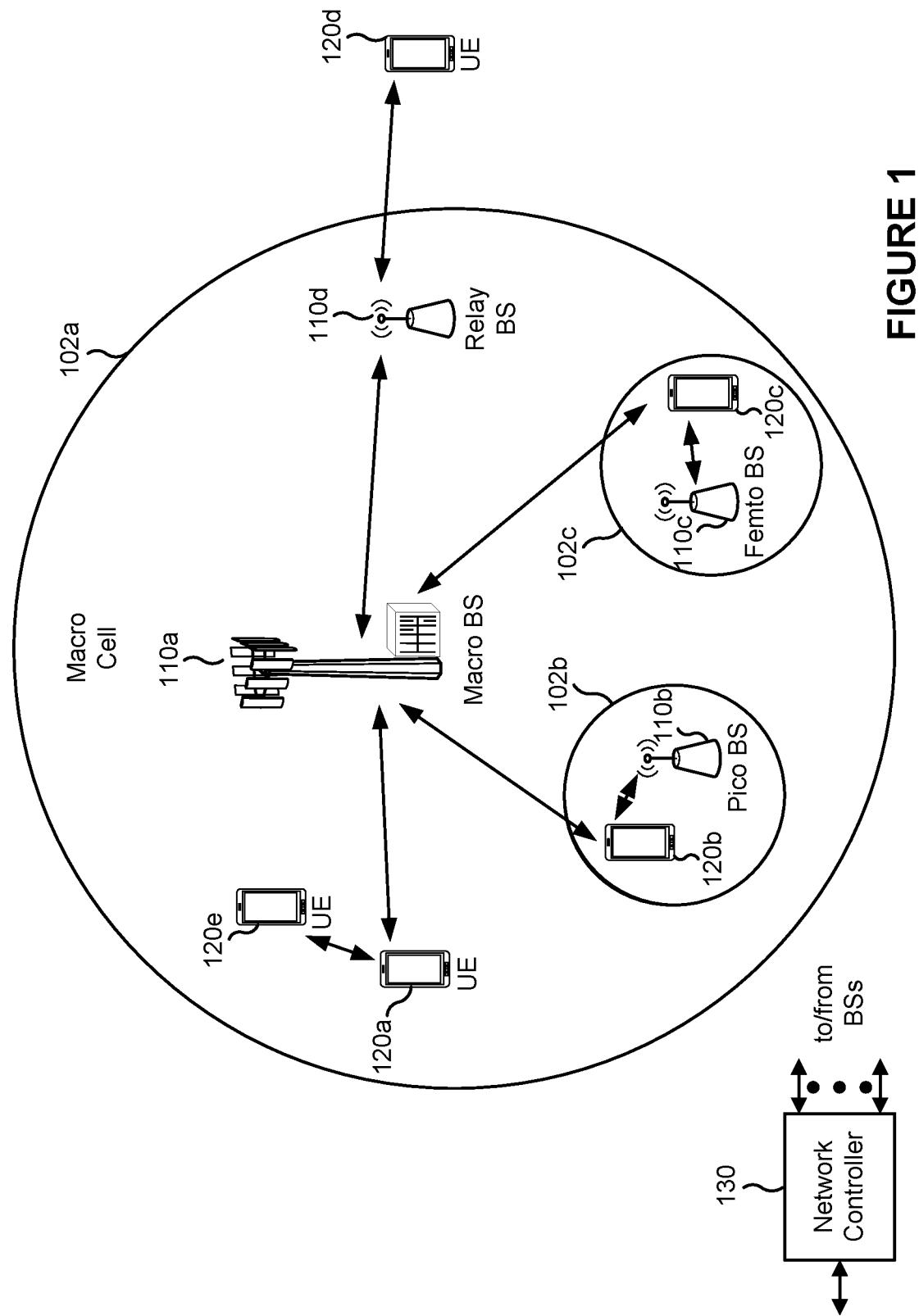
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

In NR, an aperiodic channel state information (CSI) report is triggered by a CSI reporting request transmitted from a base station to a user equipment (UE). The CSI reporting request may be associated with a CSI reporting configuration that may be used to indicate to the UE an occasion of a resource in which the UE is to perform CSI reporting. Moreover, the CSI reporting configuration may identify resources in which the UE is to measure one or more CSI reference signals (CSI-RS) and a target time interval, occurring after the occasion of the resource, that the CSI reporting is to address.

A CSI report for a target time interval may include a CSI-reference signal channel indicator (CRI), a rank indicator (RI), channel quality information (CQI), and a precoding matrix indicator (PMI). In some cases, a payload size of each of the CRI, RI, and CQI is fixed, while the PMI payload size may vary depending on the reported RI. Accordingly, a CSI report may be divided into two portions, where a first portion of the CSI report, including the CRI, RI, or CQI, has a fixed payload size, and a second portion of the CSI report, including the PMI, has a payload size that is dependent on the first portion (for example, an RI of the first portion).

In some cases, the resource in which the UE is to perform CSI reporting is insufficient to carry a payload size of CSI determined by the UE. For example, the resource may be based on an RI assumption by the base station that is different from the reported RI. In such cases, the UE may prioritize the CSI based at least in part on one or more prioritization criteria, and may omit one or more low priority CSI from the CSI report. However, prioritization criteria may not enable the UE to prioritize the CSI on a sub-time-interval basis within a target time interval. Accordingly, the UE may omit CSI that may be useful to the base station for scheduling communications in a particular target time interval.

Some aspects of the present disclosure described herein provide techniques and apparatuses for CSI reporting prioritization. In some aspects, a UE may determine CSI parts for one or more sub-time intervals of a target time interval, and prioritize the CSI parts based at least in part on respective time indices associated with the one or more sub-time intervals. In this way, CSI feedback provided by the UE may include CSI for particular sub-time intervals of the target time interval that are most useful to a base station for scheduling communications in the target time interval.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with UE(s) and may also be referred to as a Node B, an eNodeB, an eNB, a gNB, a NR BS, a 5G node B (NB), an access point (AP), a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, among other examples, or combinations thereof), a mesh network, among other examples, or combinations thereof. In such examples, the UE 120 may perform scheduling operations, resource selection operations, or other operations described elsewhere herein as being performed by the base station 110.

Figure 2:
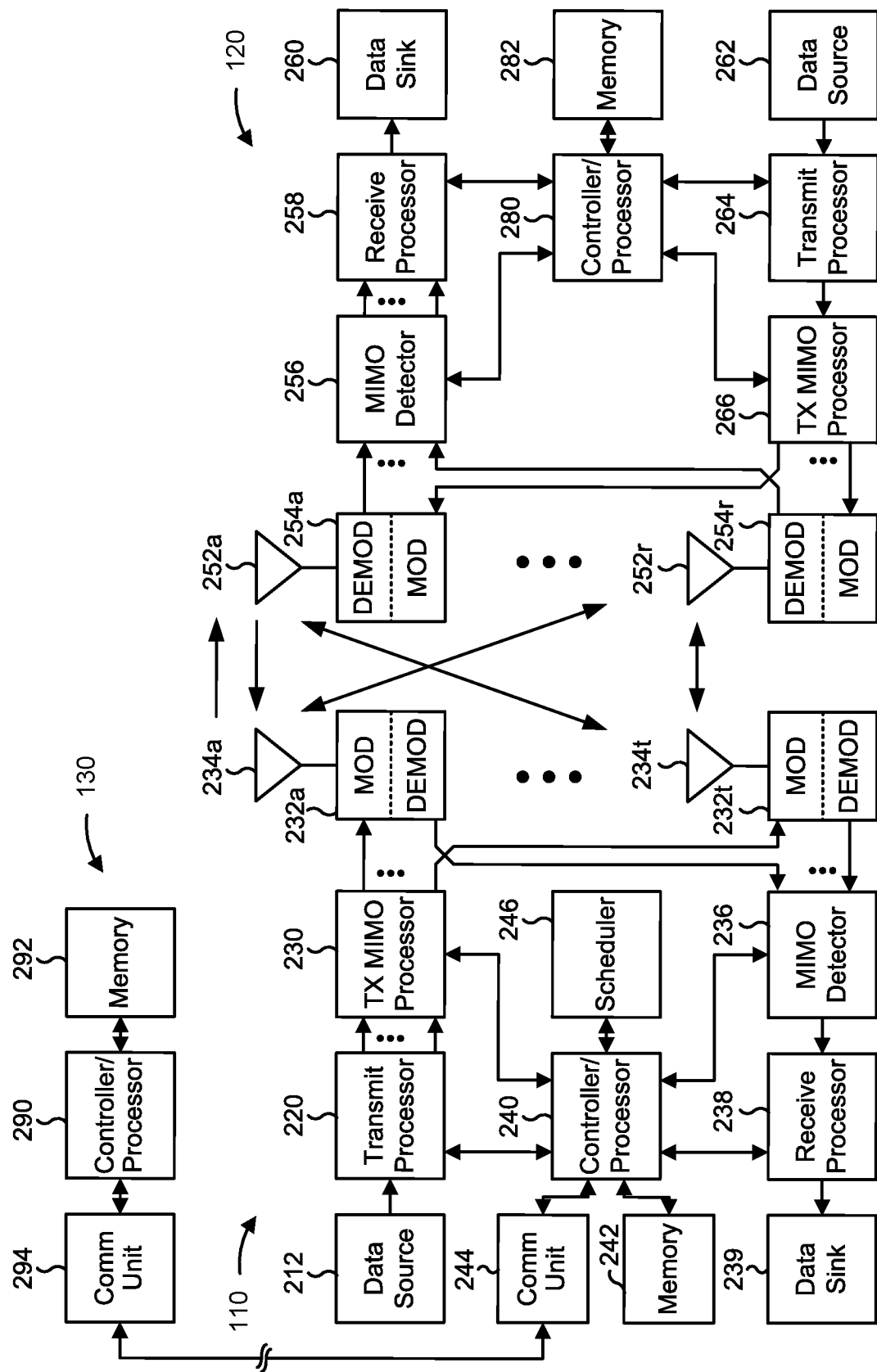
FIG. 2 is a block diagram illustrating an example base station (BS) in communication with a user equipment (UE) in a wireless network in accordance with various aspects of the present disclosure.

FIG. 2 is a block diagram illustrating an example base station in communication with a user equipment in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples, or combinations thereof) and control information (for example, CQI requests, grants, upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to Tmodulators (MODs) 232a through 232t. Each MOD 232 may process a respective output symbol stream (for example, for OFDM among other examples, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM among other examples, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with CSI reporting prioritization, as described in more detail elsewhere herein. For example, controller/processor 240 of base station 110, controller/processor 280 of UE 120, or any other component(s) of FIG. 2 may perform or direct operations of, for example, the process of FIG. 8, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving a request to transmit, in an occasion of a resource of a physical channel, a CSI report relating to a channel quality of a target time interval that is after a time interval in which a plurality of CSI reference signals associated with the CSI report are to be received, means for receiving, prior to the target time interval, the plurality of CSI reference signals associated with the CSI report, means for determining respective CSI parts for one or more sub-time intervals of the target time interval based at least in part on the plurality of CSI reference signals, means for prioritizing one or more of the CSI parts based at least in part on respective time indices associated with the one or more sub-time intervals, means for transmitting, in the occasion of the resource, a subset of the CSI parts based at least in part on prioritizing the CSI parts, among other examples, or combinations thereof. In some aspects, such means may include one or more components of UE 120 described in connection with FIG. 2.

Figure 3A:
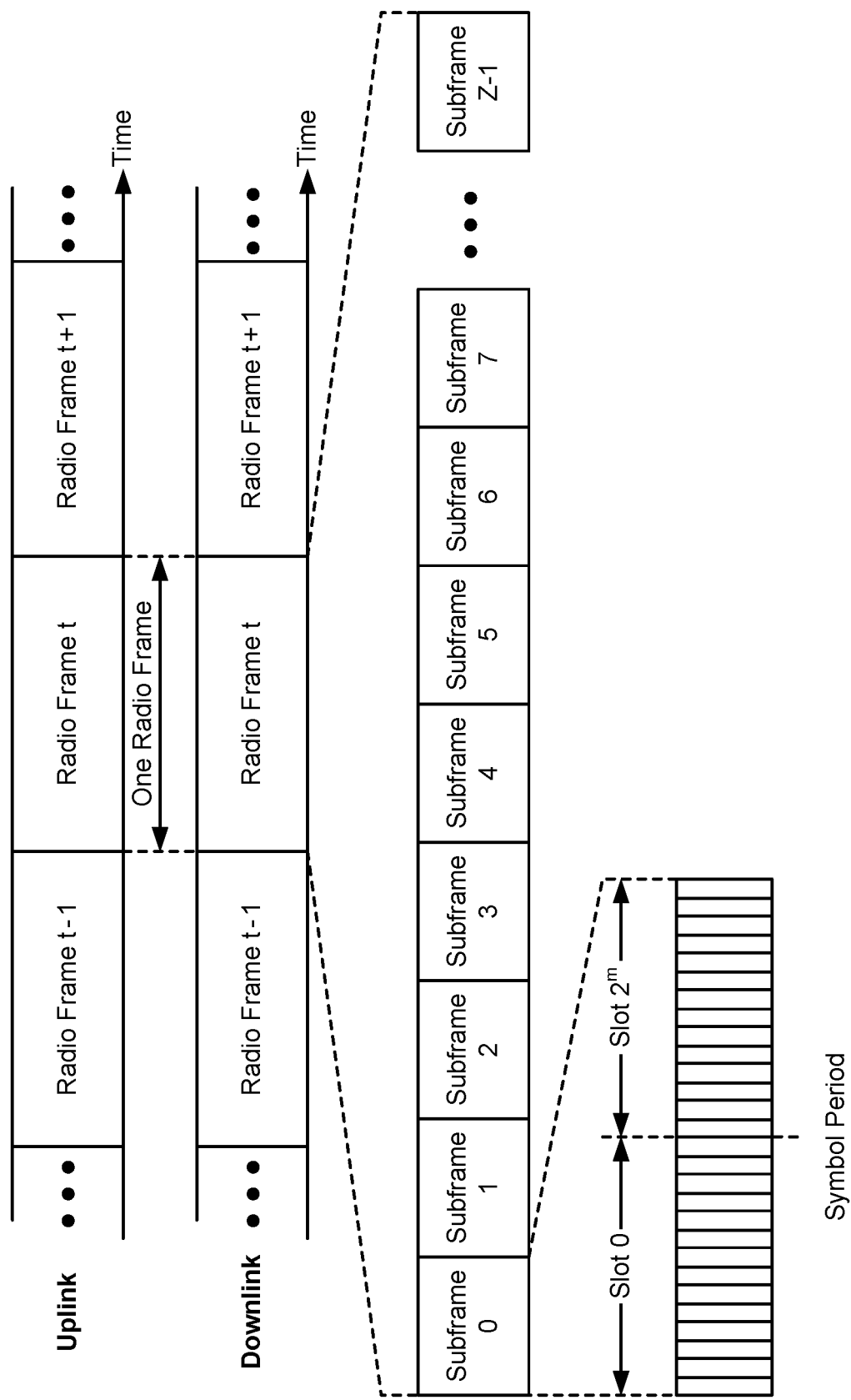
FIG. 3A is a block diagram illustrating an example frame structure for use in a wireless network in accordance with various aspects of the present disclosure.

FIG. 3A is a block diagram illustrating an example frame structure for use in a wireless network in accordance with various aspects of the present disclosure. For example, the frame structure may be used for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, $2^m$ slots per subframe are shown in FIG. 3A, where m is numerology used for a transmission, such as 0, 1, 2, 3, 4, among other examples, or combinations thereof). Each slot may include a set of L symbol periods. For example, each slot may include fourteen symbol periods (for example, as shown in FIG. 3A), seven symbol periods, or another quantity of symbol periods. In a case where the subframe includes two slots (for example, when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, among other examples, or combinations thereof.

While some techniques are described herein in connection with frames, subframes, slots, among other examples, or combinations thereof, these techniques may equally apply to other types of wireless communication structures, which may be referred to using terms other than "frame," "subframe," "slot," among other examples, or combinations thereof in 5G NR. In some aspects, a "wireless communication structure" may refer to a periodic time-bounded communication unit defined by a wireless communication standard or protocol. Additionally or alternatively, different configurations of wireless communication structures than those shown in FIG. 3A may be used.

In some telecommunications (for example, NR), a base station may transmit synchronization signals. For example, a base station may transmit a primary synchronization signal (PSS), a secondary synchronization signal (SSS), among other examples, or combinations thereof, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, or the PBCH in accordance with a synchronization communication hierarchy (for example, a synchronization signal (SS) hierarchy) including multiple synchronization communications (for example, SS blocks), as described below in connection with FIG. 3B.

Figure 3B:
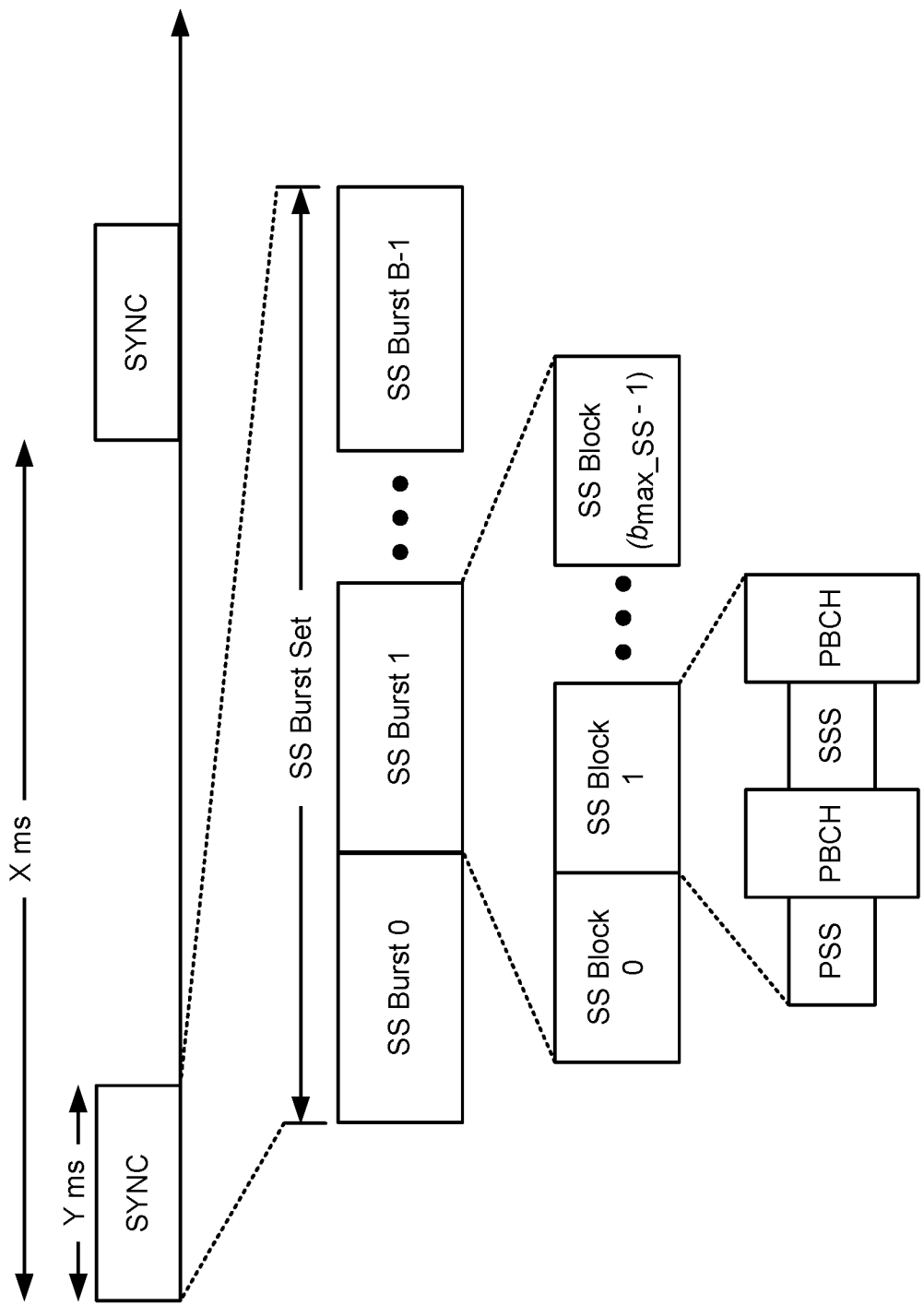
FIG. 3B is a block diagram illustrating an example synchronization communication hierarchy for use in a wireless communication network in accordance with various aspects of the present disclosure.

FIG. 3B is a block diagram illustrating an example synchronization communication hierarchy for use in a wireless communication network in accordance with various aspects of the present disclosure. The SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum quantity of repetitions of the SS burst that may be transmitted by the base station). As further shown, each SS burst may include one or more SS blocks (identified as SS block 0 through SS block (borax ss-1), where $b_{max\_SS}$−1 is a maximum quantity of SS blocks that can be carried by an SS burst). In some aspects, different SS blocks may be beam-formed differently. An SS burst set may be periodically transmitted by a wireless node, such as every Xmilliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, or other synchronization signals (for example, a tertiary synchronization signal (TSS)) or synchronization channels. In some aspects, multiple SS blocks are included in an SS burst, and the PSS, the SSS, or the PBCH may be the same across each SS block of the SS burst. In some aspects, a single SS block may be included in an SS burst. In some aspects, the SS block may be at least four symbol periods in length, where each symbol carries one or more of the PSS (for example, occupying one symbol), the SSS (for example, occupying one symbol), or the PBCH (for example, occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (for example, consecutive symbol periods) during one or more slots. Additionally or alternatively, one or more SS blocks of the SS burst may be transmitted in non-consecutive radio resources.

In some aspects, the SS bursts may have a burst period during which the SS blocks of the SS burst are transmitted by the base station in accordance with the burst period. In other words, the SS blocks may be repeated during each SS burst. In some aspects, the SS burst set may have a burst set periodicity, and the SS bursts of the SS burst set are transmitted by the base station in accordance with the fixed burst set periodicity. In other words, the SS bursts may be repeated during each SS burst set.

The base station may transmit system information, such as system information blocks (SIBS) on a physical downlink shared channel (PDSCH) in some slots. The base station may transmit control information/data on a physical downlink control channel (PDCCH) in C symbol periods of a slot, where C may be configurable for each slot. The base station may transmit traffic data or other data on the PDSCH in the remaining symbol periods of each slot.

Figure 4:
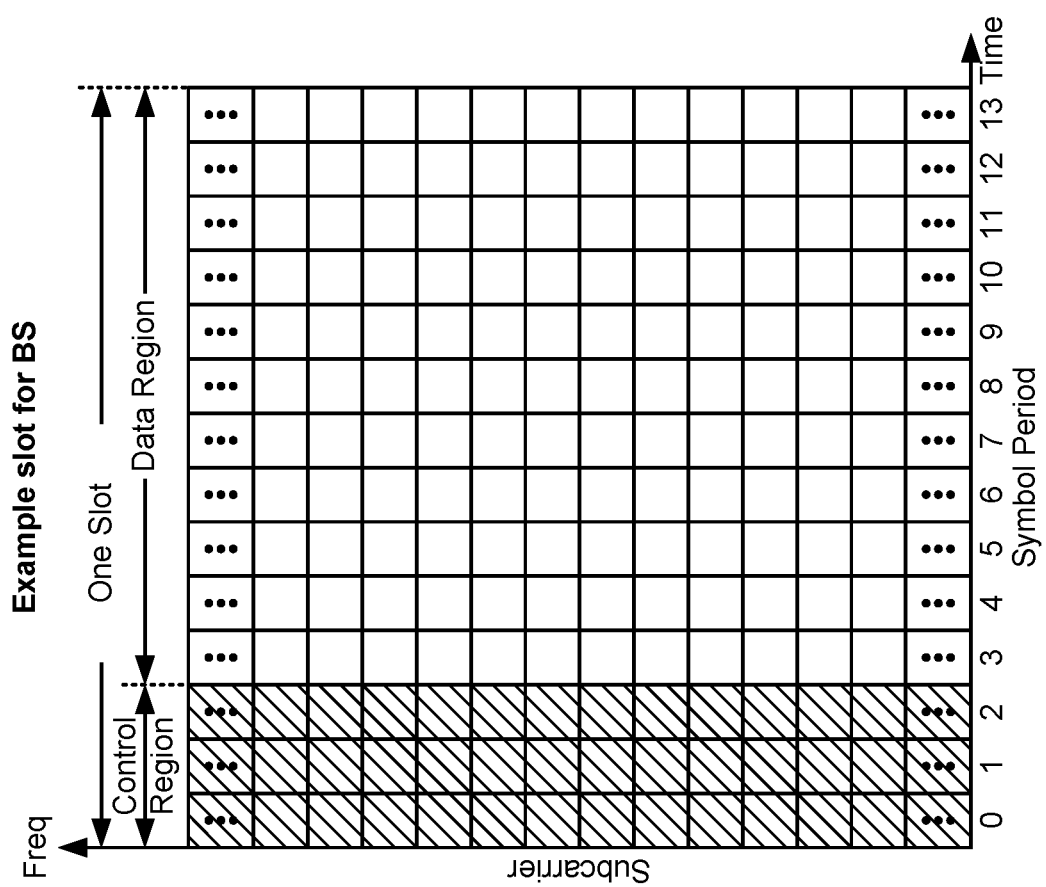
FIG. 4 is a block diagram illustrating an example slot format in accordance with various aspects of the present disclosure.

FIG. 4 is a block diagram illustrating an example slot format in accordance with various aspects of the present disclosure. The available time frequency resources may be partitioned into resource blocks. Each resource block may cover a set of subcarriers (for example, 12 subcarriers) in one slot and may include a quantity of resource elements. Each resource element may cover one subcarrier in one symbol period (for example, in time) and may be used to send one modulation symbol, which may be a real or complex value.

An interlace structure may be used for each of the downlink and uplink for FDD in some telecommunications systems (for example, NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, among other examples, or combinations thereof. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate in accordance with a new air interface (for example, other than Orthogonal Frequency Divisional Multiple Access (OFDMA)-based air interfaces) or fixed transport layer (for example, other than Internet Protocol (IP)). In aspects, NR may utilize OFDM with a cyclic prefix (CP) (herein referred to as cyclic prefix OFDM or CP-OFDM) or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) or DFT-s-OFDM on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells. Alternatively, NR may support a different air interface, other than an OFDM-based interface. NR networks may include entities such central units or distributed units.

In some wireless communication systems, a UE may report CSI to a base station. In some cases, a payload size of the CSI may be too large to be carried in an occasion of a resource allocated to the UE for CSI reporting. For example, the payload size of the CSI report may vary in accordance with an RI selection of the UE, and the base station may allocate the resource to the UE for CSI reporting without knowledge of the RI selection of the UE. In some cases, the UE may omit, from a CSI report, CSI relating to particular subbands in order to reduce the payload size of the CSI report. For example, the UE may omit the CSI relating to the particular subbands based on one or more prioritization criteria. However, the prioritization criteria may not enable the UE to prioritize the CSI on a sub-time-interval basis within a target time interval. Accordingly, the UE may omit CSI that may be useful to the base station for scheduling communications in a particular target time interval.

Some aspects of the present disclosure described herein provide techniques and apparatuses for CSI reporting prioritization. In some aspects, a UE may determine CSI parts for one or more sub-time intervals of a target time interval, and prioritize the CSI parts based at least in part on respective time indices associated with the one or more sub-time intervals. In this way, CSI feedback provided by the UE may include CSI for particular sub-time intervals of the target time interval that are most useful to a base station for scheduling communications in the target time interval.

Figure 5:
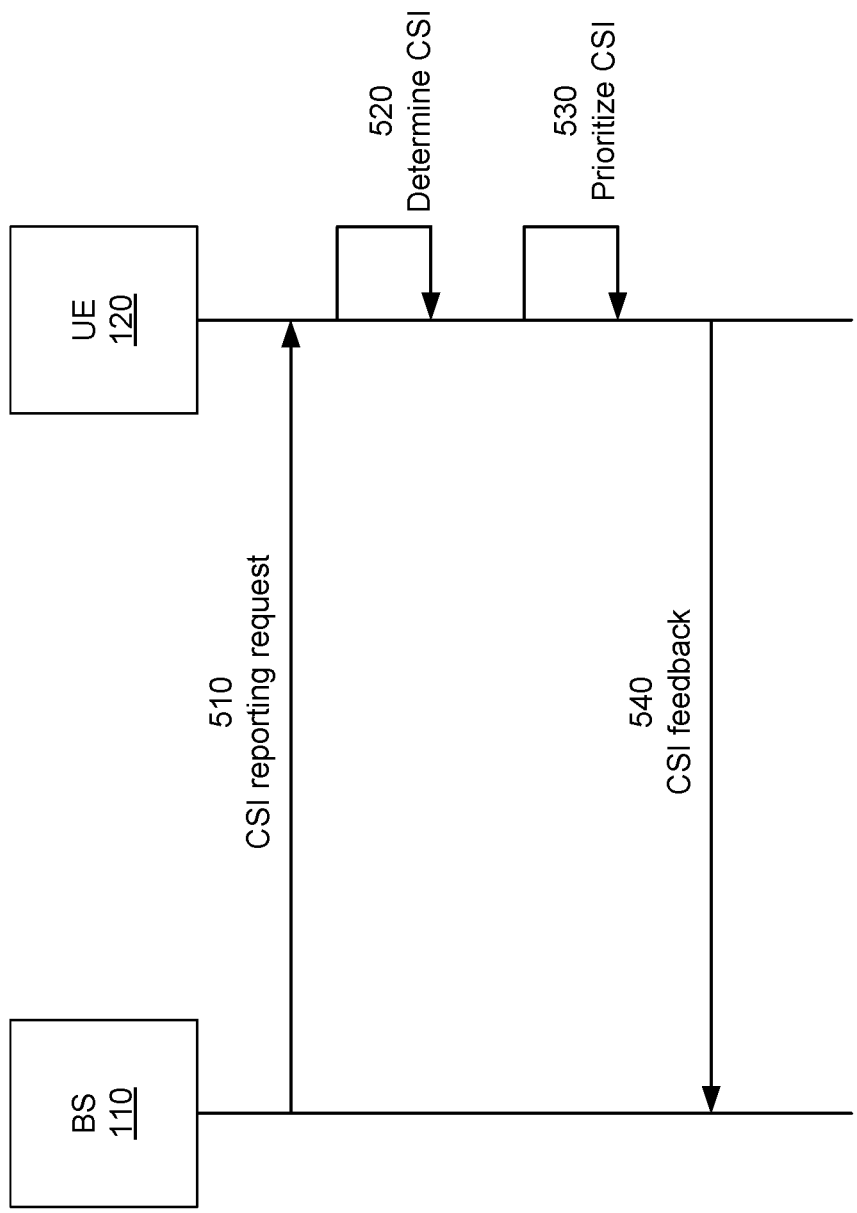
FIG. 5 is a diagram illustrating an example of channel state information (CSI) reporting prioritization in accordance with various aspects of the present disclosure.

FIG. 5 is a diagram illustrating an example of CSI reporting prioritization in accordance with various aspects of the present disclosure. As shown in FIG. 5, a BS 110 may configure a UE 120 for CSI reporting, and the UE 120 may report CSI to the BS 110. In some aspects, the CSI may be Type II CSI.

As shown in FIG. 5, in block 510, the BS 110 may transmit, and the UE 120 may receive, a CSI reporting request (for example, for aperiodic CSI reporting). The CSI reporting request may include a CSI reporting configuration that may be used by the UE 120 to identify an occasion of a resource of a physical channel in which the UE 120 is to transmit CSI feedback to the BS 110. The CSI reporting configuration also may provide parameters for one or more CSI reports that the UE 120 is to include in the CSI feedback. For example, the CSI reporting configuration may be used by the UE 120 to identify resources in which the UE 120 is to receive one or more CSI-RSs that the UE is to measure in order to determine CSI for a CSI report.

Additionally, the CSI reporting configuration may identify a target time interval for a CSI report (for example, a target time interval occurring after the occasion of the resource in which the UE 120 is to transmit the CSI report or after a time interval in which a plurality of CSI-RSs associated with the CSI report are to be received). A CSI report on a target time interval that is after the occasion of the resource in which the UE 120 is to transmit the CSI report, or after a time interval in which CSI-RSs for the CSI report are received, may be referred to as an extrapolated CSI report or a predictive CSI report. In some aspects, the CSI reporting configuration may identify a first target time interval for a first CSI report that is to be included in the CSI feedback, a second target time interval for a second CSI report that is to be included in the CSI feedback, and so forth. A CSI report may indicate channel quality parameters for a target time interval associated with the CSI report. In some aspects, a target time interval for a CSI report may be a resource of a physical channel. In some aspects, a target time interval may include one or more OFDM symbols (for example, multiple consecutive OFDM symbols), one or more slots (for example, multiple consecutive slots), one or more mini-slots, one or more subframes, or one or more frames, among other examples. In some aspects, a target time interval for a first CSI report may have a different duration from a target time interval for a second CSI report.

In some aspects, the CSI reporting configuration may identify a sub-time interval unit at which the UE 120 is to determine CSI parts for a target time interval. The CSI reporting configuration may identify a sub-time interval unit that consists of one or more OFDM symbols (for example, one OFDM symbol, two consecutive OFDM symbols, seven consecutive OFDM symbols, among other examples), one or more slots (for example, multiple consecutive slots), one or more mini-slots, one or more subframes, or one or more frames, among other examples. In some aspects, a sub-time interval unit at which the UE 120 is to perform channel quality measurements for a first CSI report may have a different duration than a sub-time interval unit at which the UE 120 is to perform channel quality measurements for a second CSI report. The sub-time interval unit identified by the CSI reporting configuration may enable the UE 120 to assign respective time indices to one or more sub-time intervals of a target time interval configured for a CSI report. For example, if a CSI report is configured for a target time interval that consists of four slots with a sub-time interval unit of one slot, the UE 120 may assign a time index of 0 to the first of the four slots, a time index of 1 to the second of the four slots, a time index of 2 to the third of the four slots, and a time index of 3 to the fourth of the four slots. In some aspects, such as when the sub-time interval unit is less than one slot, the UE 120 may assign time indices chronologically within a slot of a target time interval configured for a CSI report or across multiple slots of a target time interval configured for the CSI report.

In some aspects, the CSI reporting configuration may identify a priority order of time indices that the UE 120 is to use for prioritizing CSI, as described in more detail below. In some aspects, the UE 120 may have a static configuration that identifies a prioritization scheme that the UE 120 is to use for prioritizing CSI, as described in more detail below.

In block 520, the UE 120 may determine CSI in accordance with the CSI reporting configuration. For example, the UE 120 may receive a plurality of CSI-RSs associated with a CSI report. The UE 120 may receive the CSI-RSs prior to the occasion of the resource in which the UE 120 is to transmit the CSI feedback. The UE 120 may perform measurements of the CSI-RSs in order to determine CSI for the CSI report. The CSI may include CRI, RI, CQI, or PMI. In some aspects, Part 1 CSI of a CSI report may include CRI, RI, and CQI. Accordingly, the Part 1 CSI may have a fixed payload size. In some aspects, Part 2 CSI of the CSI report may include PMI. The PMI may vary in size in accordance with the RI indicated in the Part 1 CSI. Accordingly, the Part 2 CSI may have a variable payload size. In some aspects, Part 1 CSI of the CSI report may include a first plurality of CSI parts for CRI, RI, and CQI, and Part 2 CSI of the CSI report may include a second plurality of CSI parts for PMI.

In some aspects, the UE 120 may determine CSI for a target time interval configured for a CSI report (for example, based at least in part on measurements of a plurality of CSI-RSs). The CSI for the CSI report may be subdivided into multiple CSI parts (that is, multiple portions of a content of the CSI) respectively associated with multiple sub-time intervals of the target time interval configured for the CSI report. For example, the UE 120 may determine a CSI part for each sub-time interval for a target time interval. Moreover, the UE 120 may determine a CSI part for each subband for the target time interval. For example, the UE 120 may determine a CSI part for each subband at each sub-time interval of the target time interval. In other words, the UE 120 may determine a CSI part for each sub-time interval and subband combination. Each subband may be assigned a subband index, for example, in a manner similar to that described above for time indices. Accordingly, a CSI part determined by the UE 120 for a particular sub-time interval and subband combination may be associated with a particular time index and a particular subband index. In some aspects, the UE 120 may determine wideband CSI parts across multiple (for example, all) subbands for the target time interval (for example, wideband CSI parts respectively associated with the sub-time intervals of the target time interval). In some aspects, the UE 120 may determine CSI across multiple (for example, all) sub-time intervals for the target time interval (referred to herein as wide-time CSI).

In block 530, the UE 120 may prioritize the CSI parts for inclusion in the CSI feedback that is to be transmitted by the UE 120. For example, the UE 120 may prioritize the CSI parts based at least in part on time indices associated with the CSI parts, as described in more detail below in connection with FIGS. 6 and 7. In some aspects, the UE 120 may prioritize first CSI parts for Part 1 CSI of a CSI report (for example, CSI parts for CRI, RI, and CQI) and prioritize second CSI parts for Part 2 CSI of the CSI report (for example, CSI parts for PMI), as described in more detail below. In some other aspects, the UE 120 may prioritize CSI parts for Part 2 CSI of a CSI report (for example, CSI parts for PMI), as described in more detail below. In some aspects, the UE 120 may prioritize the CSI parts based at least in part on a determination that a payload size of the CSI (or a payload size of the Part 2 CSI) satisfies a threshold value (for example, a threshold value corresponding to a payload capacity of the occasion of the resource allocated to the UE 120 for CSI reporting).

In some aspects, the UE 120 may map the prioritized CSI parts to uplink control information (UCI) for the CSI feedback. For example, the UE 120 may map the prioritized CSI parts to the UCI starting from the most-significant bits of the UCI. In such a case, the UE 120 may omit a portion of the least-significant bits of the UCI based at least in part on a determination that a code rate of the UCI does not satisfy a threshold value (for example, the code rate is above the threshold value). For example, the UE 120 may omit a portion of the least-significant bits of the UCI such that the code rate of the UCI satisfies the threshold value (for example, the code rate is below the threshold value). Accordingly, the CSI feedback of the UCI may include one or more CSI parts having a higher priority and may omit one or more CSI parts having a lower priority.

In block 540, the UE 120 may transmit, and the BS 110 may receive, the CSI feedback based on prioritizing the CSI parts. For example, the UE 120 may transmit the UCI for the CSI feedback to the BS 110 in block 540. As an example, the UE 120 may transmit the UCI in a physical uplink shared channel (PUSCH) (for example, the CSI feedback may be aperiodic).

In some aspects, the CSI feedback may include a subset of the CSI determined by the UE 120. For example, the CSI feedback may include all of the CSI determined by the UE 120 when a payload size of all of the CSI fits within the occasion of the resource allocated to the UE 120 for CSI reporting. As another example, the CSI feedback may include a portion of the CSI determined by the UE 120 (in accordance with the prioritized CSI) when a payload size of all of the CSI does not fit within the occasion of the resource allocated to the UE 120 for CSI reporting. In this way, the CSI feedback can include at least the portion of the CSI that may be most useful to the BS 110 for scheduling communications with the UE 120.

In some aspects, the CSI feedback may include differential, rather than absolute, CSI. That is, second CSI parts that are prioritized after first CSI parts may be differential relative to the first CSI parts. For example, CSI parts associated with a first time index may be prioritized first, CSI parts associated with a second time index may be prioritized second, CSI parts associated with a third time index may be prioritized third, and so forth. Continuing with the previous example, the CSI parts associated with the second time index may be differential relative to the CSI parts associated with the first time index, the CSI parts associated with the third time index may be differential relative to the CSI parts associated with the second time index, and so forth.

Figure 6:
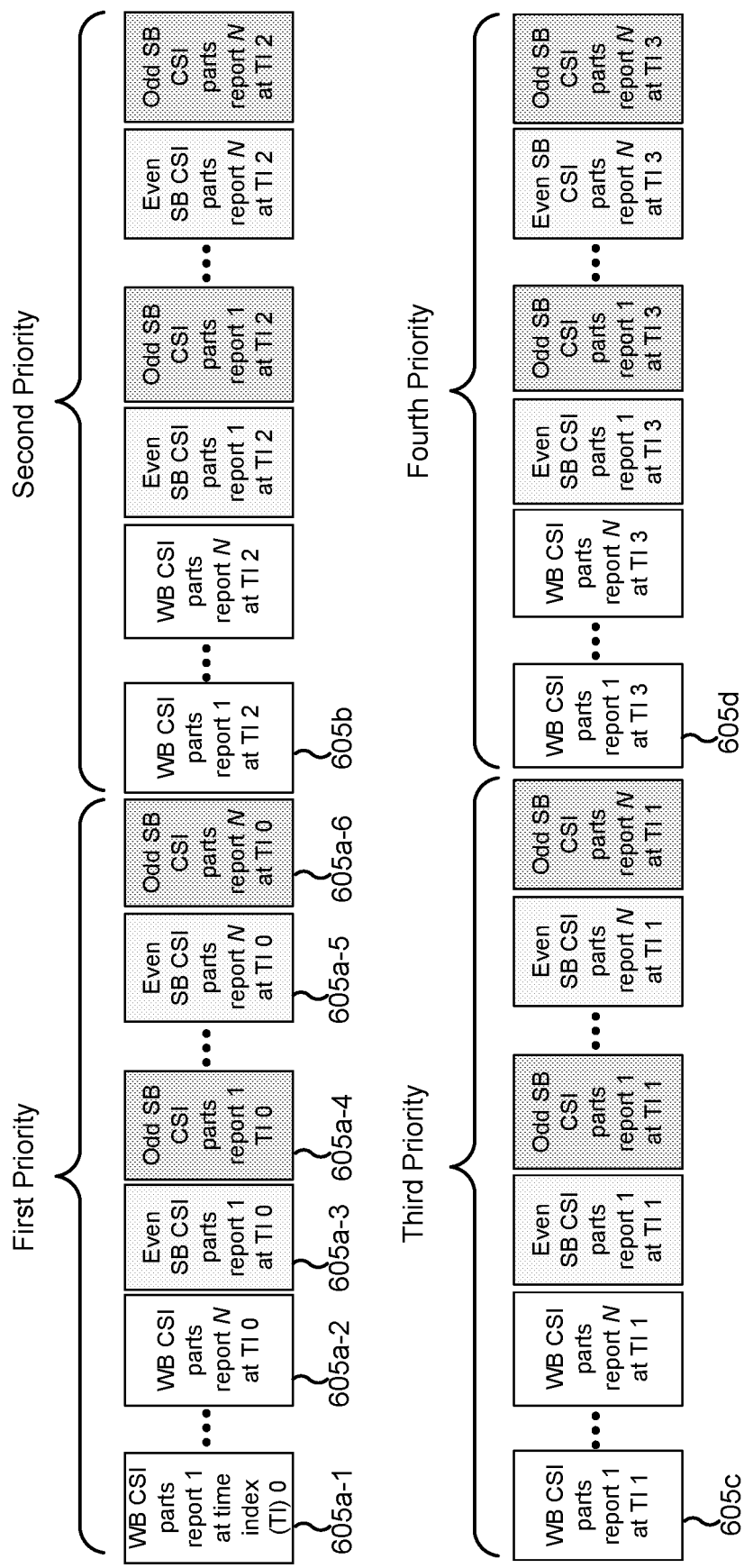
FIG. 6 is a diagram illustrating an example of CSI reporting prioritization in accordance with various aspects of the present disclosure.

FIG. 6 is a diagram illustrating an example of CSI reporting prioritization in accordance with various aspects of the present disclosure. In particular, FIG. 6 shows a prioritization scheme that a UE (for example, UE 120) may use to prioritize CSI parts 605, such as when a payload size of the CSI is too large to be carried in an occasion of a resource allocated for CSI reporting. The prioritization scheme may be based at least in part on time indices associated with the CSI parts 605. As shown in FIG. 6, the prioritization scheme may prioritize CSI parts 605 (shown as reports 1-N) associated with a target time interval. Moreover, the example of FIG. 6 is based on a target time interval that is characterized by four sub-time intervals (that is, four time indices). However, in some aspects, a target time interval may be characterized by more or less than four sub-time intervals.

As shown in FIG. 6, a first prioritization of the CSI parts 605 may be by time index (as described above, a particular time index may be associated with a particular sub-time interval of a target time interval). In other words, CSI parts associated with a highest priority time index (corresponding to a highest priority sub-time interval of a target time interval) may be prioritized first, CSI parts associated with a second-highest priority time index (corresponding to a second-highest priority sub-time interval of a target time interval) may be prioritized second, and so forth. In some aspects, priorities for the time indices may be based at least in part on whether a time index is an even number or an odd number. For example, CSI parts associated with time indices that are even numbers may be prioritized (for example, chronologically by time index) before CSI parts associated with time indices that are odd numbers. As an example, as shown in FIG. 6, CSI parts 605a associated with time index 0 (even) may be prioritized first, CSI parts 605b associated with time index 2 (even) may be prioritized second, CSI parts 605c associated with time index 1 (*odd*) may be prioritized third, and CSI parts 605d associated with time index 3 (*odd*) may be prioritized fourth. In some other aspects, CSI parts associated with time indices that are odd numbers may be prioritized (for example, chronologically by time index) before CSI parts associated with time indices that are even numbers.

In some aspects, priorities for the time indices may be based at least in part on a configured priority order. For example, a CSI reporting configuration, as described in more detail above in connection with FIG. 5, may indicate a particular order in which time indices are to be given priority. As an example, the configured priority order may indicate that CSI parts 605d associated with time index 3 may be prioritized first, CSI parts 605a associated with time index 0 may be prioritized second, CSI parts 605c associated with time index 1 may be prioritized third, and CSI parts 605b associated with time index 2 may be prioritized fourth.

As shown in FIG. 6, a second prioritization of the CSI parts 605 may be by frequency band. For example, after prioritization of the CSI parts 605 by time index, the CSI parts 605 for a particular time index may be prioritized by frequency band. In some aspects, wide-time CSI (for example, of reports 1-N) may be prioritized before wideband (WB) CSI parts. In some aspects, wideband CSI parts may be prioritized before subband (SB) CSI parts. For example, as shown in FIG. 6, wideband CSI parts 605a-1, 605a-2 of reports 1-N may be prioritized first, subband CSI parts 605a-3 of report 1 that are associated with a subband index that is an even number may be prioritized second, subband CSI parts 605a-4 of report 1 that are associated with a subband index that is an odd number may be prioritized fourth, subband CSI parts 605a-5 of report N (for example, report 2) that are associated with a subband index that is an even number may be prioritized fifth, subband CSI parts 605a-6 of report N (for example, report 2) that are associated with a subband index that is an odd number may be prioritized sixth, and so forth.

In other words, wideband CSI parts 605a-1, 605a-2 for a particular time index may be prioritized before subband CSI parts 605a-3, 605a-4, 605a-5, 605a-6 for the particular time index. The wideband CSI parts of the particular time index may be prioritized based at least in part on a chronological order of reports associated with the wideband CSI parts. For example, wideband CSI part 605a-1 of a first report on a first sub-time interval may be prioritized first, wideband CSI part 605a-2 of an Nth report (for example, a second report) on an Nth sub-time interval (for example, a second sub-time interval) may be prioritized second, and so forth.

The subband CSI parts of the particular time index may be prioritized primarily by a chronological order of reports associated with the subband CSI parts, and secondarily by whether subband indices associated with the subband CSI parts are even numbers or odd numbers. In some aspects, subband CSI parts 605a-3 associated with subband indices that are even numbers may be prioritized before subband CSI parts 605a-4 associated with subband indices that are odd numbers. For example, subband CSI parts 605a-3, of a first report on a first sub-time interval, that are associated with subband indices that are even numbers may be prioritized first, subband CSI parts 605a-4, of the first report, that are associated with subband indices that are odd numbers may be prioritized second, subband CSI parts 605*a*-5, of an Nth report (for example, a second report) on an Nth sub-time interval (for example, a second sub-time interval), that are associated with subband indices that are even numbers may be prioritized third, subband CSI parts 605*a*-6, of the Nth report, that are associated with subband indices that are odd numbers may be prioritized fourth, and so forth. In some other examples, subband CSI parts associated with subband indices that are odd numbers may be prioritized before subband CSI parts associated with subband indices that are even numbers.

Figure 7:
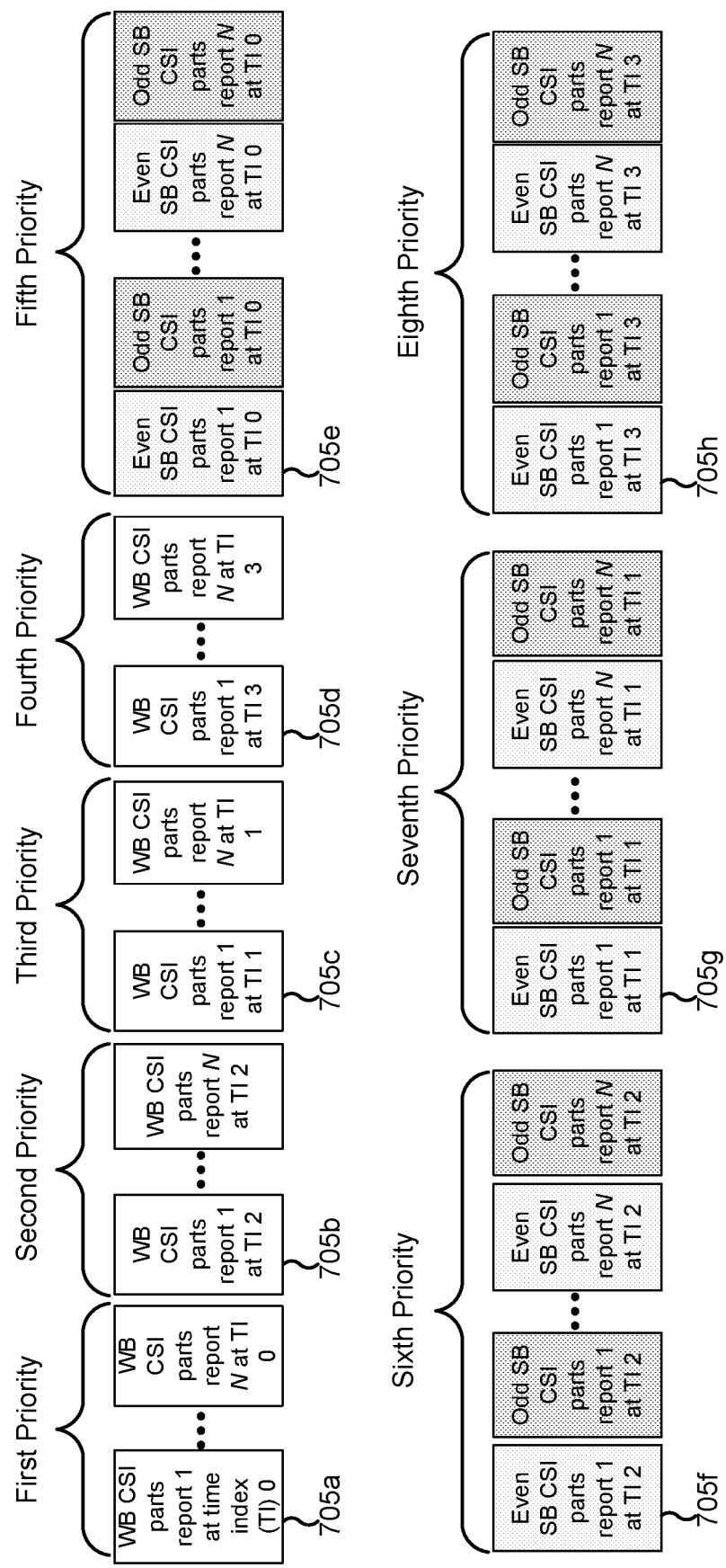
FIG. 7 is a diagram illustrating an example of CSI reporting prioritization in accordance with various aspects of the present disclosure.

FIG. 7 is a diagram illustrating an example of CSI reporting prioritization in accordance with various aspects of the present disclosure. In particular, FIG. 7 shows a prioritization scheme that a UE (for example, UE 120) may use to prioritize CSI parts 705, such as when a payload size of the CSI is too large to be carried in an occasion of a resource allocated for CSI reporting. The prioritization scheme may be based at least in part on time indices associated with the CSI parts 705. As shown in FIG. 7, the prioritization scheme may prioritize CSI parts 705 (shown as reports 1-N) associated with a target time interval. Moreover, the example of FIG. 7 is based on a target time interval that is characterized by four sub-time intervals (that is, four time indices). However, in other aspects, a target time interval may be characterized by more or less than four sub-time intervals.

As shown in FIG. 7, a first prioritization of the CSI parts 705 may be by frequency band. In some aspects, wide-time CSI (for example, for reports 1-N) may be prioritized before wideband (WB) CSI parts. In some aspects, wideband CSI parts may be prioritized before subband (SB) CSI parts. As shown in FIG. 7, a second prioritization of the CSI parts may be by time index (as described above, a particular time index may be associated with a particular sub-time interval of a target time interval). For example, after prioritization of the wideband CSI parts before the subband CSI parts, the wideband CSI parts may be prioritized by time index and the subband CSI parts may be prioritized by time index.

For example, wideband CSI parts associated with a time index that has a highest priority (corresponding to a highest priority sub-time interval of a target time interval) may be prioritized first among the wideband CSI parts, wideband CSI parts associated with a time index that has a second-highest priority (corresponding to a second-highest priority sub-time interval of a target time interval) may be prioritized second among the wideband CSI parts, and so forth. Similarly, subband CSI parts associated with a time index that has a highest priority may be prioritized first among the subband CSI parts, subband CSI parts associated with a time index that has a second-highest priority may be prioritized second among the subband CSI parts, and so forth.

In some aspects, priorities for the time indices may be based at least in part on whether a time index is an even number or an odd number. For example, wideband CSI parts associated with time indices that are even numbers may be prioritized (for example, chronologically by time index) before wideband CSI parts associated with time indices that are odd numbers. As an example, as shown in FIG. 7, wideband CSI parts 705*a* associated with time index 0 (even) may be prioritized first among wideband CSI parts, wideband CSI parts 705*b* associated with time index 2 (even) may be prioritized second among wideband CSI parts, wideband CSI parts 705*c* associated with time index 1 (*odd*) may be prioritized third among wideband CSI parts, and wideband CSI parts 705*d* associated with time index 3 (*odd*) may be prioritized fourth among wideband CSI parts. In some other aspects, wideband CSI parts associated with time indices that are odd numbers may be prioritized (for example, chronologically by time index) before wideband CSI parts associated with time indices that are even numbers.

Similarly, subband CSI parts associated with time indices that are even numbers may be prioritized (for example, chronologically by time index) before subband CSI parts associated with time indices that are odd numbers. As an example, as shown in FIG. 7, subband CSI parts 705*e* associated with time index 0 (even) may be prioritized first among subband CSI parts, subband CSI parts 705*f* associated with time index 2 (even) may be prioritized second among subband CSI parts, subband CSI parts 705*g* associated with time index 1 (*odd*) may be prioritized third among subband CSI parts, and subband CSI parts 705*h* associated with time index 3 (*odd*) may be prioritized fourth among subband CSI parts. In some other aspects, subband CSI parts associated with time indices that are odd numbers may be prioritized (for example, chronologically by time index) before subband CSI parts associated with time indices that are even numbers.

In some aspects, priorities for the time indices may be based at least in part on a configured priority order. For example, a CSI reporting configuration, as described in more detail above in connection with FIG. 5, may indicate a particular order in which time indices are to be given priority. As an example, the configured priority order may indicate that wideband CSI parts 705*d* associated with time index 3 may be prioritized first among wideband CSI parts, wideband CSI parts 705*a* associated with time index 0 may be prioritized second among wideband CSI parts, wideband CSI parts 705*b* associated with time index 1 may be prioritized third among wideband CSI parts, and wideband CSI parts 705*c* associated with time index 2 may be prioritized fourth among wideband CSI parts. Similarly, the configured priority order may indicate that subband CSI parts 705*h* associated with time index 3 may be prioritized first among subband CSI parts, subband CSI parts 705*e* associated with time index 0 may be prioritized second among subband CSI parts, subband CSI parts 705*g* associated with time index 1 may be prioritized third among subband CSI parts, and subband CSI parts 705*f* associated with time index 2 may be prioritized fourth among subband CSI parts.

In some aspects, wideband CSI parts for a particular time index may be prioritized as described in more detail above in connection with FIG. 6. In some aspects, subband CSI parts for a particular time index may be prioritized as described in more detail above in connection with FIG. 6.

Figure 8:
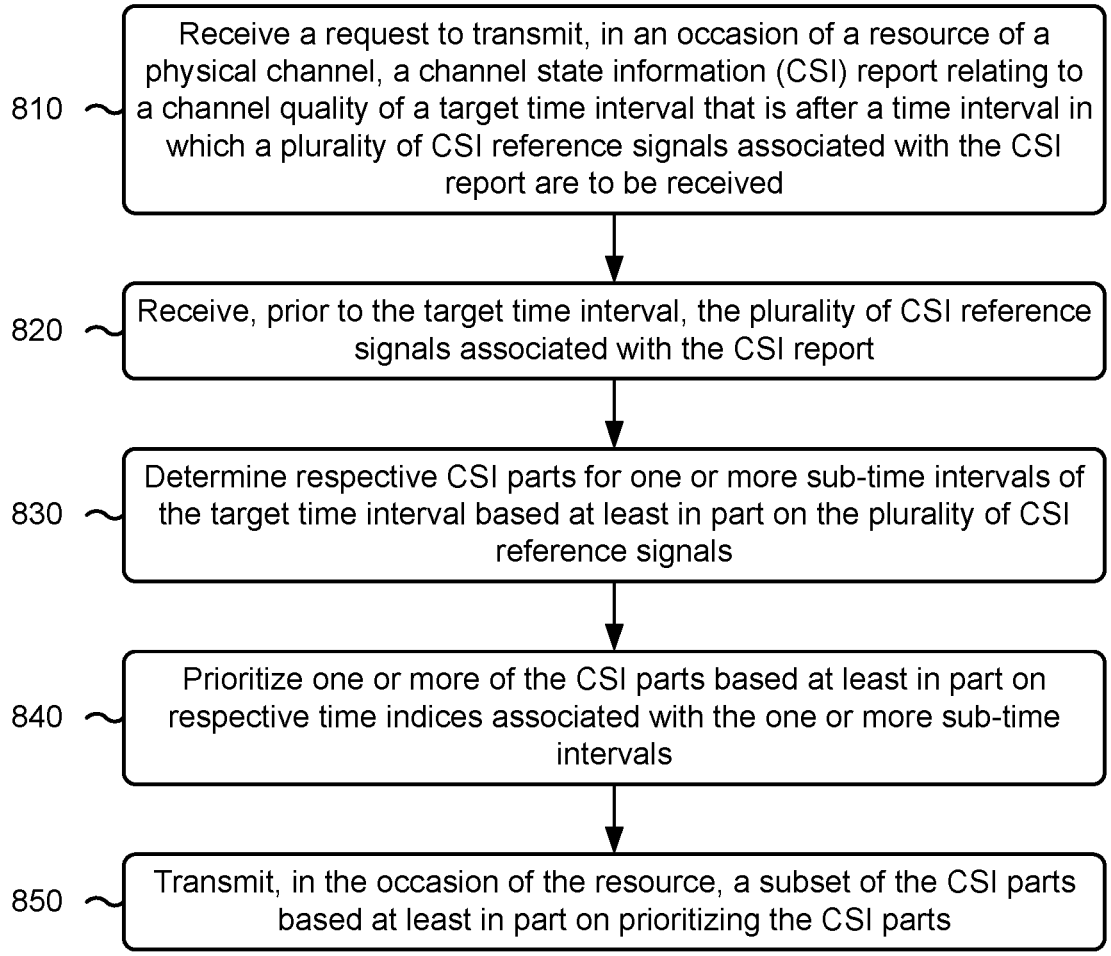
FIG. 8 is a diagram illustrating an example process performed by a UE in accordance with various aspects of the present disclosure.

FIG. 8 is a diagram illustrating an example process 800 performed, for example, by a UE, in accordance with various aspects of the present disclosure. The example process 800 is an example where a UE, such as UE 120, performs operations associated with CSI reporting prioritization.

As shown in FIG. 8, in some aspects, the process 800 may include receiving a request to transmit, in an occasion of a resource of a physical channel, a CSI report relating to a channel quality of a target time interval that is after a time interval in which a plurality of CSI reference signals associated with the CSI report are to be received (block 810). For example, the UE (using antenna 252, DEMOD 254, MIMO detector 256, receive processor 258, controller/processor 280, among other possibilities/examples) may receive a request to transmit, in an occasion of a resource of a physical channel, a CSI report relating to a channel quality of a target time interval that is after a time interval in which a plurality of CSI reference signals associated with the CSI report are to be received, as described above.

As further shown in FIG. 8, in some aspects, the process 800 may include receiving, prior to the target time interval, the plurality of CSI reference signals associated with the CSI report (block 820). For example, the UE (using antenna 252, DEMOD 254, MIMO detector 256, receive processor 258, controller/processor 280, among other possibilities/examples) may receive, prior to the target time interval, the plurality of CSI reference signals associated with the CSI report, as described above.

As further shown in FIG. 8, in some aspects, the process 800 may include determining respective CSI parts for one or more sub-time intervals of the target time interval based at least in part on the plurality of CSI reference signals (block 830). For example, the UE (using controller/processor 280, among other possibilities/examples) may determine respective CSI parts for one or more sub-time intervals of the target time interval based at least in part on the plurality of CSI reference signals, as described above.

As further shown in FIG. 8, in some aspects, the process 800 may include prioritizing one or more of the CSI parts based at least in part on respective time indices associated with the one or more sub-time intervals (block 840). For example, the UE (using controller/processor 280, among other possibilities/examples) may prioritize one or more of the CSI parts based at least in part on respective time indices associated with the one or more sub-time intervals, as described above.

As further shown in FIG. 8, in some aspects, the process 800 may include transmitting, in the occasion of the resource, a subset of the CSI parts based at least in part on prioritizing the CSI parts (block 850). For example, the UE (using controller/processor 280, transmit processor 264, TX MIMO processor 266, MOD 254, antenna 252, among other possibilities/examples) may transmit, in the occasion of the resource, a subset of the CSI parts based at least in part on prioritizing the CSI parts, as described above.

The process 800 may include additional aspects, such as any single aspect or any combination of aspects described below or in connection with one or more other processes described elsewhere herein.

In a first additional aspect, the subset of the CSI parts includes one or more of the CSI parts having a higher priority and omits one or more of the CSI parts having a lower priority. In some examples, prioritizing the one or more of the CSI parts may include determining to include one or more of the CSI parts having a higher priority in the subset of the CSI parts and to omit one or more of the CSI parts having a lower priority from the subset of the CSI parts. In a second additional aspect, alone or in combination with the first aspect, the subset of the CSI parts omits one or more of the CSI parts based at least in part on a determination that a payload size of the CSI parts satisfies a threshold value. In some examples, the process 800 may include determining that a payload size of the CSI parts satisfies a threshold value, and determining to omit one or more of the CSI parts from the subset of CSI parts based at least in part on determining that the payload size of the CSI parts satisfies the threshold value.

In a third additional aspect, alone or in combination with one or more of the first and second aspects, prioritizing the CSI parts includes prioritizing first CSI parts associated with time indices that are one of even numbers or odd numbers before second CSI parts associated with time indices that are the other of even numbers or odd numbers. In a fourth additional aspect, alone or in combination with one or more of the first through third aspects, the process 800 further includes prioritizing the first CSI parts or the second CSI parts based at least in part on frequency bands associated with the first CSI parts or the second CSI parts. In a fifth additional aspect, alone or in combination with one or more of the first through fourth aspects, prioritizing the first CSI parts or the second CSI parts includes prioritizing wideband CSI parts before subband CSI parts, and prioritizing subband CSI parts associated with subband indices that are one of even numbers or odd numbers before subband CSI parts associated with subband indices that are the other of even numbers or odd numbers.

In a sixth additional aspect, alone or in combination with one or more of the first through fifth aspects, prioritizing the CSI parts includes prioritizing the CSI parts in accordance with a configured priority order for the respective time indices associated with the one or more sub-time intervals. In a seventh additional aspect, alone or in combination with one or more of the first through sixth aspects, the process 800 further includes prioritizing the CSI parts for a particular time index based at least in part on frequency bands associated with the CSI parts of the particular time index. In an eighth additional aspect, alone or in combination with one or more of the first through seventh aspects, prioritizing the CSI parts of the particular time index includes prioritizing wideband CSI parts before subband CSI parts, and prioritizing subband CSI parts associated with subband indices that are one of even numbers or odd numbers before subband CSI parts associated with subband indices that are the other of even numbers or odd numbers.

In a ninth additional aspect, alone or in combination with one or more of the first through eighth aspects, prioritizing the CSI parts includes prioritizing wideband CSI parts before subband CSI parts, and prioritizing the wideband CSI parts or the subband CSI parts based at least in part on the respective time indices associated with the one or more sub-time intervals. In a tenth additional aspect, alone or in combination with one or more of the first through ninth aspects, the process 800 further includes prioritizing the wideband CSI parts or the subband CSI parts based at least in part on the respective time indices associated with the one or more sub-time intervals. In an eleventh additional aspect, alone or in combination with one or more of the first through tenth aspects, prioritizing the wideband CSI parts or the subband CSI parts includes prioritizing first CSI parts associated with time indices that are one of even numbers or odd numbers before second CSI parts associated with time indices that are the other of even numbers or odd numbers, or prioritizing the wideband CSI parts or the subband CSI parts in accordance with a configured priority order for the respective time indices associated with the one or more sub-time intervals.

In a twelfth additional aspect, alone or in combination with one or more of the first through eleventh aspects, prioritizing the wideband CSI parts or the subband CSI parts includes prioritizing the wideband CSI parts or the subband CSI parts in accordance with a configured priority order for the respective time indices associated with the one or more sub-time intervals.

In a thirteenth additional aspect, alone or in combination with one or more of the first through twelfth aspects, a sub-time interval of the one or more sub-time intervals corresponds to one or more symbols or a slot. In a fourteenth additional aspect, alone or in combination with one or more of the first through thirteenth aspects, first CSI parts associated with a first time index are differential relative to second CSI parts associated with a second time index. In a fifteenth additional aspect, alone or in combination with one or more of the first through fourteenth aspects, prioritizing the CSI parts includes prioritizing wide-time CSI before wideband CSI, and the wide-time CSI are associated with multiple sub-time intervals of the target time interval.

Although FIG. 8 shows example blocks of the process 800, in some aspects, the process 800 may include additional blocks, fewer blocks, different blocks, or differently arranged blocks than those depicted in FIG. 8. Additionally or alternatively, two or more of the blocks of the process 800 may be performed in parallel.

Figure 9:
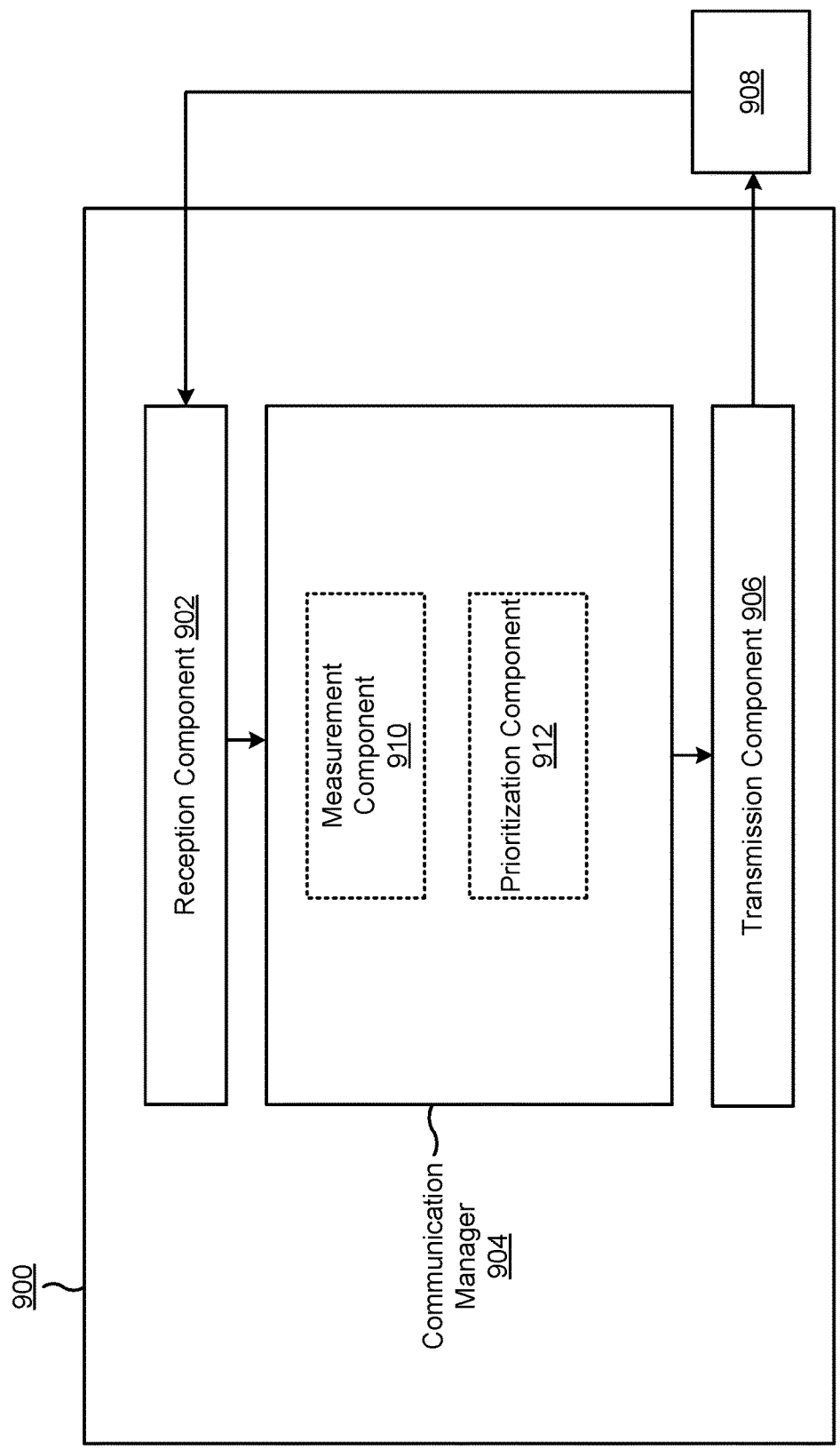
FIG. 9 is a block diagram of an example apparatus for wireless communication in accordance with various aspects of the present disclosure.

FIG. 9 is a block diagram of an example apparatus 900 for wireless communication in accordance with various aspects of the present disclosure. The apparatus 900 may be a UE, or a UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 5-7. Additionally or alternatively, the apparatus 900 may be configured to perform one or more processes described herein, such as process 800 of FIG. 8, or a combination thereof. In some aspects, the apparatus 900 may include one or more components of the UE described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE described above in connection with FIG. 2. In some aspects, the transmission component 906 may be co-located with the reception component 902 in a transceiver.

The communication manager 904 may receive, or may cause the reception component 902 to receive, a request to transmit, in an occasion of a resource of a physical channel, a CSI report relating to a channel quality of a target time interval that is after a time interval in which a plurality of CSI reference signals associated with the CSI report are to be received. The communication manager 904 may receive, or may cause the reception component 902 to receive, prior to the target time interval, the plurality of CSI reference signals associated with the CSI report. The communication manager 904 may determine respective CSI parts for one or more sub-time intervals of the target time interval based at least in part on the plurality of CSI reference signals. The communication manager 904 may prioritize one or more of the CSI parts based at least in part on respective time indices associated with the one or more sub-time intervals. The communication manager may transmit, in the occasion of the resource, a subset of the CSI parts based at least in part on prioritizing the CSI parts. In some aspects, the communication manager 904 may include a controller/processor, a memory, or a combination thereof, of the UE described above in connection with FIG. 2.

In some aspects, the communication manager 904 may include a set of components, such as a measurement component 910, a prioritization component 912, or a combination thereof. Alternatively, the set of components may be separate and distinct from the communication manager 904. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The measurement component 910 may determine respective CSI parts for one or more sub-time intervals of the target time interval based at least in part on the plurality of CSI reference signals. For example, the measurement component 910 may perform measurement of the CSI reference signals to thereby determine the respective CSI parts. The prioritization component 912 may prioritize one or more of the CSI parts based at least in part on respective time indices associated with the one or more sub-time intervals.

In some aspects, the prioritization component 912 may determine to include one or more of the CSI parts having a higher priority in the subset of the CSI parts and to omit one or more of the CSI parts having a lower priority from the subset of the CSI parts. In some aspects, the prioritization component 912 may determine that a payload size of the CSI parts satisfies a threshold value, and determine to omit one or more of the CSI parts from the subset of CSI parts based at least in part on determining that the payload size of the CSI parts satisfies the threshold value.

In some aspects, the prioritization component 912 may prioritize first CSI parts associated with time indices that are one of even numbers or odd numbers before second CSI parts associated with time indices that are the other of even numbers or odd numbers. In some aspects, the prioritization component 912 may prioritize the first CSI parts or the second CSI parts based at least in part on frequency bands associated with the first CSI parts or the second CSI parts.

In some aspects, the prioritization component 912 may prioritize wideband CSI parts before subband CSI parts, and prioritize subband CSI parts associated with subband indices that are one of even numbers or odd numbers before subband CSI parts associated with subband indices that are the other of even numbers or odd numbers.

In some aspects, the prioritization component 912 may prioritize the CSI parts in accordance with a configured priority order for the respective time indices associated with the one or more sub-time intervals. In some aspects, the prioritization component 912 may prioritize the CSI parts for a particular time index based at least in part on frequency bands associated with the CSI parts of the particular time index. In some aspects, the prioritization component 912 may prioritize wideband CSI parts before subband CSI parts, and prioritize subband CSI parts associated with subband indices that are one of even numbers or odd numbers before subband CSI parts associated with subband indices that are the other of even numbers or odd numbers.

In some aspects, the prioritization component 912 may prioritize wideband CSI parts before subband CSI parts, and prioritize the wideband CSI parts or the subband CSI parts based at least in part on the respective time indices associated with the one or more sub-time intervals. In some aspects, the prioritization component 912 may prioritize first CSI parts associated with time indices that are one of even numbers or odd numbers before second CSI parts associated with time indices that are the other of even numbers or odd numbers, or prioritize the wideband CSI parts or the subband CSI parts in accordance with a configured priority order for the respective time indices associated with the one or more sub-time intervals. In some aspects, the prioritization component 912 may prioritize wide-time CSI before wideband CSI.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, among other examples, or combinations thereof), and may be used interchangeably with "one or more." Where only one item is intended, the phrase "only one" or similar language is used. Also, as used herein, the terms "has," "have," "having," among other examples, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving a request to transmit, in an occasion of a resource of a physical channel, a channel state information (CSI) report relating to a channel quality of a target time interval that is after a time interval in which a plurality of CSI reference signals associated with the CSI report are to be received;
receiving, prior to the target time interval, the plurality of CSI reference signals associated with the CSI report;
determining respective CSI parts, associated with portions of content of the plurality of CSI reference signals, for one or more sub-time intervals of the target time interval based at least in part on the plurality of CSI reference signals, wherein the respective CSI parts include at least one of CSI-reference signal channel indicator (CRI), a rank indicator (RI), channel quality information (CQI), or a precoding matrix indicator (PMI);
prioritizing one or more of the respective CSI parts based at least in part on respective time indices associated with the one or more sub-time intervals; and
transmitting, in the occasion of the resource, a subset of the respective CSI parts based at least in part on prioritizing the one or more of the respective CSI parts.

2. The method of claim 1, wherein the subset of the respective CSI parts includes one or more of the respective CSI parts having a higher priority and omits one or more of the respective CSI parts having a lower priority.

3. The method of claim 1, wherein the subset of the respective CSI parts omits one or more of the respective CSI parts based at least in part on a determination that a payload size of the one or more of the respective CSI parts satisfying a threshold value.

4. The method of claim 1, wherein prioritizing the one or more of the respective CSI parts comprises prioritizing first CSI parts associated with time indices that are one of even numbers or odd numbers before second CSI parts associated with time indices that are the other of even numbers or odd numbers.

5. The method of claim 4, further comprising:
prioritizing the first CSI parts, associated with the time indices that are one of even numbers or odd numbers, before the second CSI parts, associated with the time indices that are the other of even numbers or odd numbers, based at least in part on:
one or more frequency bands associated with the first CSI parts, or
one or more frequency bands associated with the second CSI parts.

6. The method of claim 5, wherein prioritizing the first CSI parts before the second CSI parts comprises prioritizing wideband CSI parts before subband CSI parts, and prioritizing subband CSI parts, associated with subband indices that are one of even numbers or odd numbers, before subband CSI parts associated with subband indices that are the other of even numbers or odd numbers.

7. The method of claim 1, wherein prioritizing the one or more of the respective CSI parts comprises prioritizing the one or more of the respective CSI parts in accordance with a configured priority order for the respective time indices associated with the one or more sub-time intervals.

8. The method of claim 7, further comprising prioritizing the one or more of the respective CSI parts for a particular time index based at least in part on frequency bands, associated with the one or more of the respective CSI parts of the particular time index, and prioritizing the one or more of the respective CSI parts in accordance with the configured priority order.

9. The method of claim 8, wherein prioritizing the one or more of the respective CSI parts of the particular time index comprises prioritizing wideband CSI parts before subband CSI parts, and prioritizing subband CSI parts, associated with subband indices that are one of even numbers or odd numbers, before subband CSI parts associated with subband indices that are the other of even numbers or odd numbers.

10. The method of claim 1, wherein prioritizing the one or more of the respective CSI parts comprises prioritizing wideband CSI parts or subband CSI parts based at least in part on the respective time indices associated with the one or more sub-time intervals.

11. The method of claim 10, wherein prioritizing the wideband CSI parts or the subband CSI parts comprises prioritizing first CSI parts, associated with time indices that are one of even numbers or odd numbers, before second CSI parts associated with time indices that are the other of even numbers or odd numbers, or prioritizing the wideband CSI parts or the subband CSI parts in accordance with a configured priority order for the respective time indices associated with the one or more sub-time intervals.

12. The method of claim 1, wherein prioritizing the one or more of the respective CSI parts comprises prioritizing wide-time CSI before wideband CSI, and wherein the wide-time CSI are associated with multiple sub-time intervals of the target time interval.

13. A user equipment (UE) for wireless communication, comprising:
a memory; and
one or more processors coupled to the memory, the one or more processors configured to:
receive a request to transmit, in an occasion of a resource of a physical channel, a channel state information (CSI) report relating to a channel quality of a target time interval that is after a time interval in which a plurality of CSI reference signals associated with the CSI report are to be received;
receive, prior to the target time interval, the plurality of CSI reference signals associated with the CSI report;
determine respective CSI parts, associated with portions of content of the plurality of CSI reference signals, for one or more sub-time intervals of the target time interval based at least in part on the plurality of CSI reference signals, wherein the respective CSI parts include at least one of CSI-reference signal channel indicator (CRI), a rank indicator (RI), channel quality information (CQI), or a precoding matrix indicator (PMI);
prioritize one or more of the respective CSI parts based at least in part on respective time indices associated with the one or more sub-time intervals; and
transmit, in the occasion of the resource, a subset of the respective CSI parts based at least in part on prioritizing the one or more CSI parts.

14. The UE of claim 13, wherein the subset of the respective CSI parts includes one or more of the respective CSI parts having a higher priority and omits one or more of the respective CSI parts having a lower priority.

15. The UE of claim 13, wherein the subset of the respective CSI parts omits one or more of the respective CSI parts based at least in part on a determination that a payload size of the one or more of the respective CSI parts satisfying a threshold value.

16. The UE of claim 13, wherein the one or more processors, to prioritize the one or more of the respective CSI parts, are configured to prioritize first CSI parts associated with time indices that are one of even numbers or odd numbers before second CSI parts associated with time indices that are the other of even numbers or odd numbers.

17. The UE of claim 16, wherein the one or more processors are further configured to prioritize the first CSI parts, associated with the time indices that are one of even numbers or odd numbers, before the second CSI parts, associated with the time indices that are the other of even numbers or odd numbers, based at least in part on:
one or more frequency bands associated with the first CSI parts, or
one or more frequency bands associated with the second CSI parts.

18. The UE of claim 17, wherein the one or more processors, to prioritize the first CSI parts or the second CSI parts, are configured to prioritize wideband CSI parts before subband CSI parts, and prioritize subband CSI parts, associated with subband indices that are one of even numbers or odd numbers, before subband CSI parts associated with subband indices that are the other of even numbers or odd numbers.

19. The UE of claim 13, wherein the one or more processors, to prioritize the one or more of the respective CSI parts, are configured to prioritize the one or more of the respective CSI parts in accordance with a configured priority order for the respective time indices associated with the one or more sub-time intervals.

20. The UE of claim 19, wherein the one or more processors are further configured to prioritize the one or more of the respective CSI parts for a particular time index based at least in part on frequency bands, associated with the one or more of the respective CSI parts of the particular time index, and prioritize the one or more of the respective CSI parts in accordance with the configured priority order.

21. The UE of claim 20, wherein the one or more processors, to prioritize the one or more of the respective CSI parts of the particular time index, are configured to prioritize wideband CSI parts before subband CSI parts, and prioritize subband CSI parts, associated with subband indices that are one of even numbers or odd numbers, before subband CSI parts associated with subband indices that are the other of even numbers or odd numbers.

22. The UE of claim 13, wherein the one or more processors, to prioritize the one or more of the respective CSI parts, are configured to prioritize wideband CSI parts or subband CSI parts based at least in part on the respective time indices associated with the one or more sub-time intervals.

23. The UE of claim 22, wherein the one or more processors, to prioritize the wideband CSI parts or the subband CSI parts, are configured to prioritize first CSI parts, associated with time indices that are one of even numbers or odd numbers, before second CSI parts associated with time indices that are the other of even numbers or odd numbers, or prioritize the wideband CSI parts or the subband CSI parts in accordance with a configured priority order for the respective time indices associated with the one or more sub-time intervals.

24. The UE of claim 13, wherein prioritizing the one or more of the respective CSI parts comprises prioritizing wide-time CSI before wideband CSI, and wherein the wide-time CSI are associated with multiple sub-time intervals of the target time interval.

25. An apparatus for wireless communication, comprising:
means for receiving a request to transmit, in an occasion of a resource of a physical channel, a channel state information (CSI) report relating to a channel quality of a target time interval that is after a time interval in which a plurality of CSI reference signals associated with the CSI report are to be received;
means for receiving, prior to the target time interval, the plurality of CSI reference signals associated with the CSI report;
means for determining respective CSI parts, associated with portions of content of the plurality of CSI reference signals, for one or more sub-time intervals of the target time interval based at least in part on the plurality of CSI reference signals, wherein the respective CSI parts include at least one of CSI-reference signal channel indicator (CRI), a rank indicator (RI), channel quality information (CQI), or a precoding matrix indicator (PMI);
means for prioritizing one or more of the respective CSI parts based at least in part on respective time indices associated with the one or more sub-time intervals; and
means for transmitting, in the occasion of the resource, a subset of the one or more of the respective CSI parts based at least in part on prioritizing the one or more of the respective CSI parts.

26. The apparatus of claim 25, wherein the means for prioritizing the one or more of the respective CSI parts comprises means for prioritizing first CSI parts associated with time indices that are one of even numbers or odd numbers before second CSI parts associated with time indices that are the other of even numbers or odd numbers.

27. The apparatus of claim 25, wherein the means for prioritizing the one or more of the respective CSI parts comprises means for prioritizing the one or more of the respective CSI parts in accordance with a configured priority order for the respective time indices associated with the one or more sub-time intervals.

* * * * *